United States Patent [19]
Belt

[11] Patent Number: 5,819,616
[45] Date of Patent: Oct. 13, 1998

[54] APPARATUS AND METHOD FOR PROVIDING A RELEASE TAB ON LINED TAPE

[76] Inventor: James G. Belt, 141 Water St., Waterville, Ohio 43566

[21] Appl. No.: 706,844

[22] Filed: Sep. 3, 1996

[51] Int. Cl.⁶ ................................................. B26D 7/00
[52] U.S. Cl. .................................. 83/23; 83/27; 83/861; 83/872; 156/257; 156/510
[58] Field of Search ............................ 83/23, 27, 861, 83/872, 870; 156/257, 258, 510, 512, 517, 519

[56] References Cited

U.S. PATENT DOCUMENTS

| | | | |
|---|---|---|---|
| 4,025,373 | 5/1977 | Hirsch et al. | 156/517 |
| 4,069,077 | 1/1978 | Baumgatner | 156/510 |
| 4,171,239 | 10/1979 | Hirsch et al. | 156/519 |
| 4,220,490 | 9/1980 | Carlson | 156/257 |
| 4,317,852 | 3/1982 | Ogden | 428/40 |
| 4,341,828 | 7/1982 | Stephens | 428/40 |
| 4,475,969 | 10/1984 | Reed | 156/152 |
| 4,849,043 | 7/1989 | Instance | 156/227 |
| 5,167,752 | 12/1992 | Dowling | 156/512 |
| 5,492,590 | 2/1996 | Sakai | 156/344 |

Primary Examiner—Maurina T. Rachuba
Attorney, Agent, or Firm—John C. Purdue; David C. Purdue

[57] ABSTRACT

Apparatus for removing a portion of tape from a lined tape is disclosed. The apparatus comprises a carriage with an anvil, a tape advancer for advancing lined tape along the carriage to position and end portion of the tape adjacent to a working surface of the anvil, a rotatable cutter positioned adjacent to the anvil and an actuator for causing relative movement between the anvil and the cutter so that an end portion of the tape lays down on the anvil and an end portion of the tape is sheared from the lined tape, leaving the adjacent end portion of the liner intact. The apparatus may include a tape cutter and actuators for cutting the tabbed tape while it is applied to a part. A method for producing a lined tape with an integral liner release tab is also disclosed. Lined tape is supplied to a carriage including an anvil and a tape advancer which advances the tape so that an end portion extends over a working surface of the anvil. Relative movement is effected between a cutter and the anvil so that the tape lays down on the anvil, liner side down and so that the cutter shears an end portion of the tape from the lined tape, leaving a release tab consisting of the liner. The method may include the step of applying an end of the tape to a tape receiving portion of a part and cutting the tabbed tape to a desired length.

5 Claims, 8 Drawing Sheets

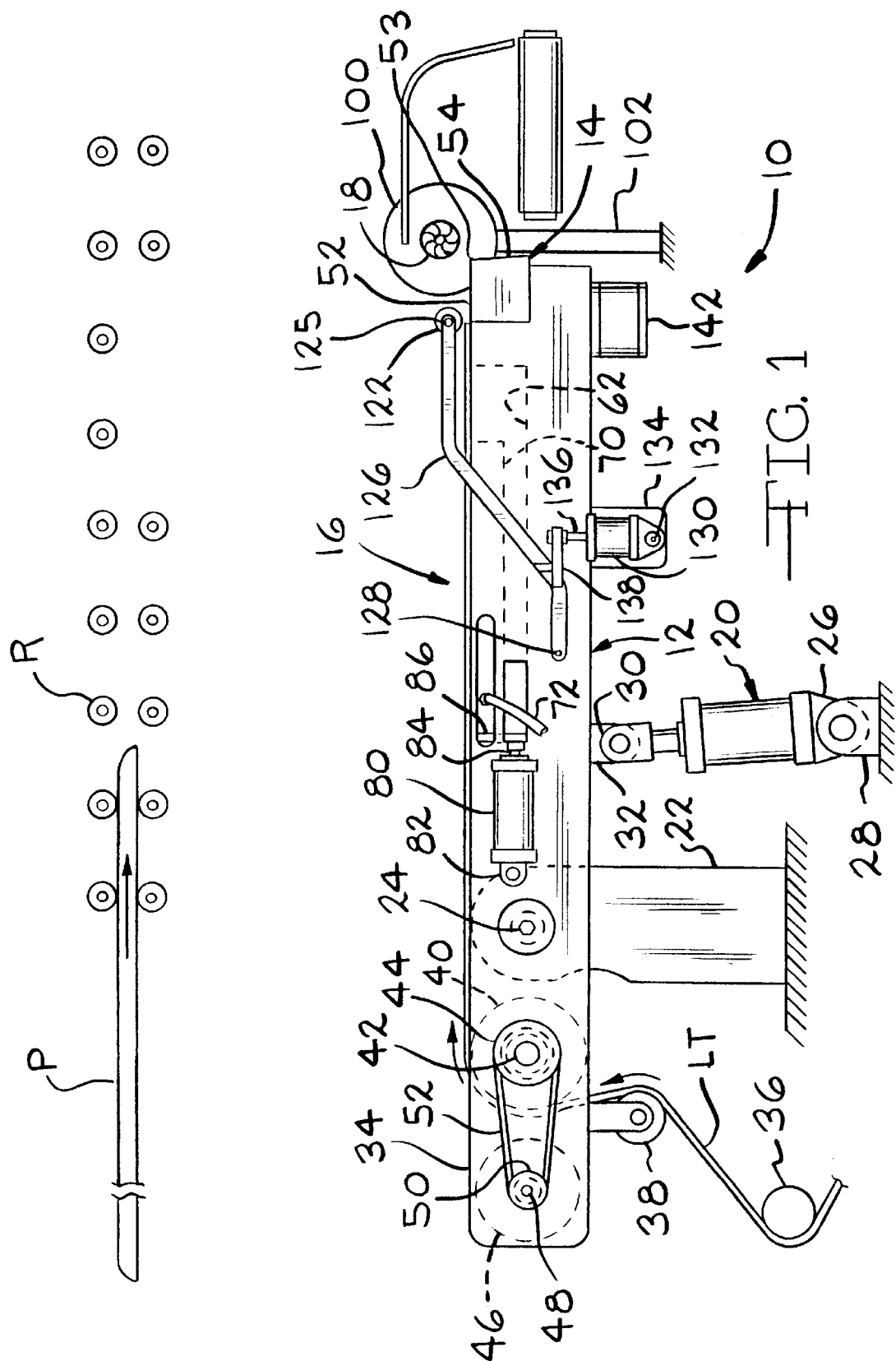

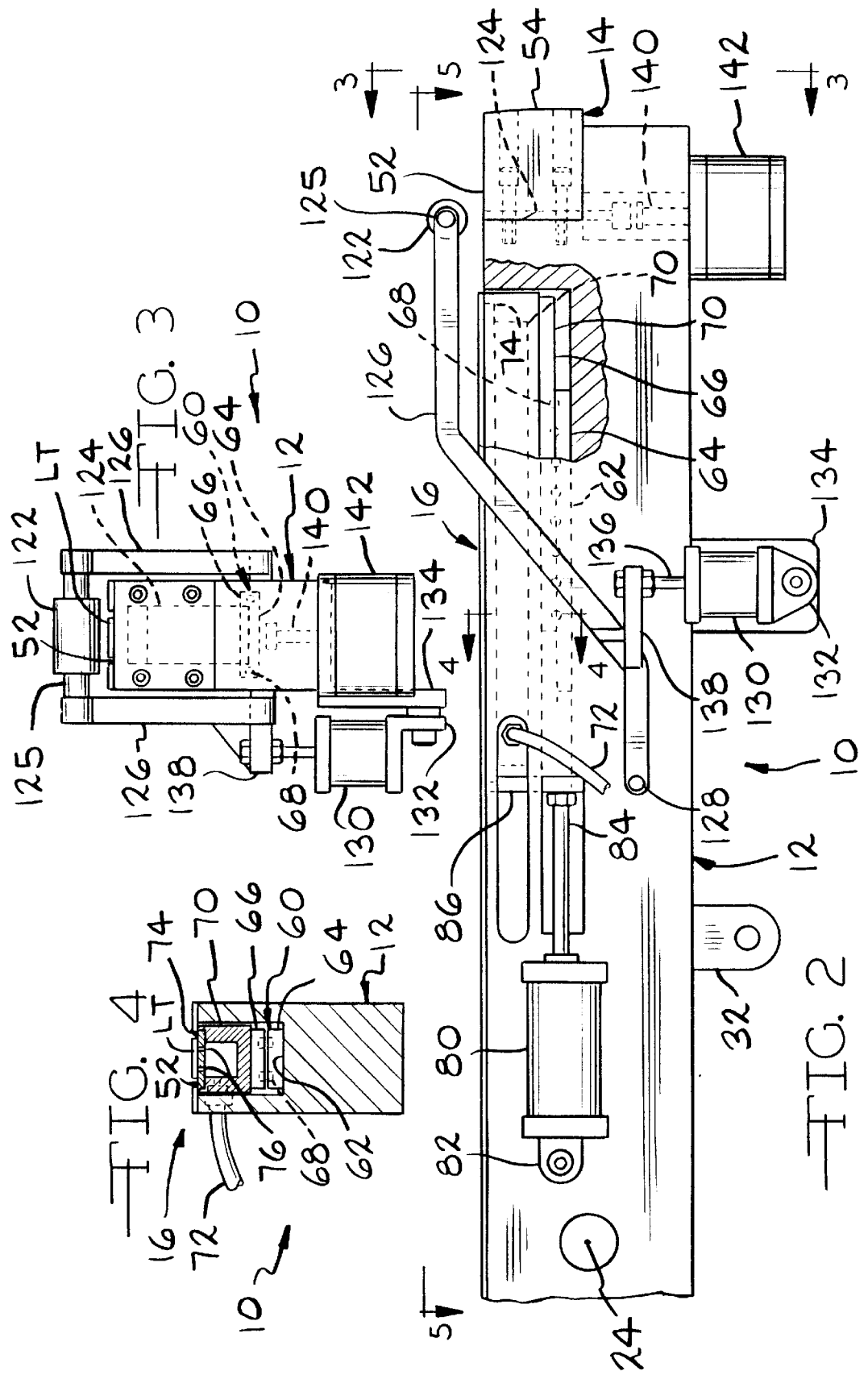

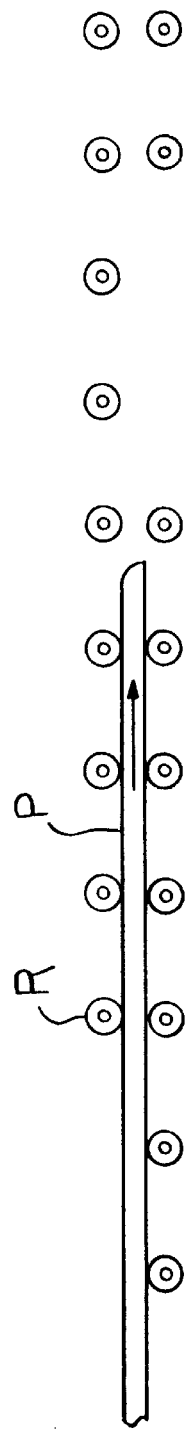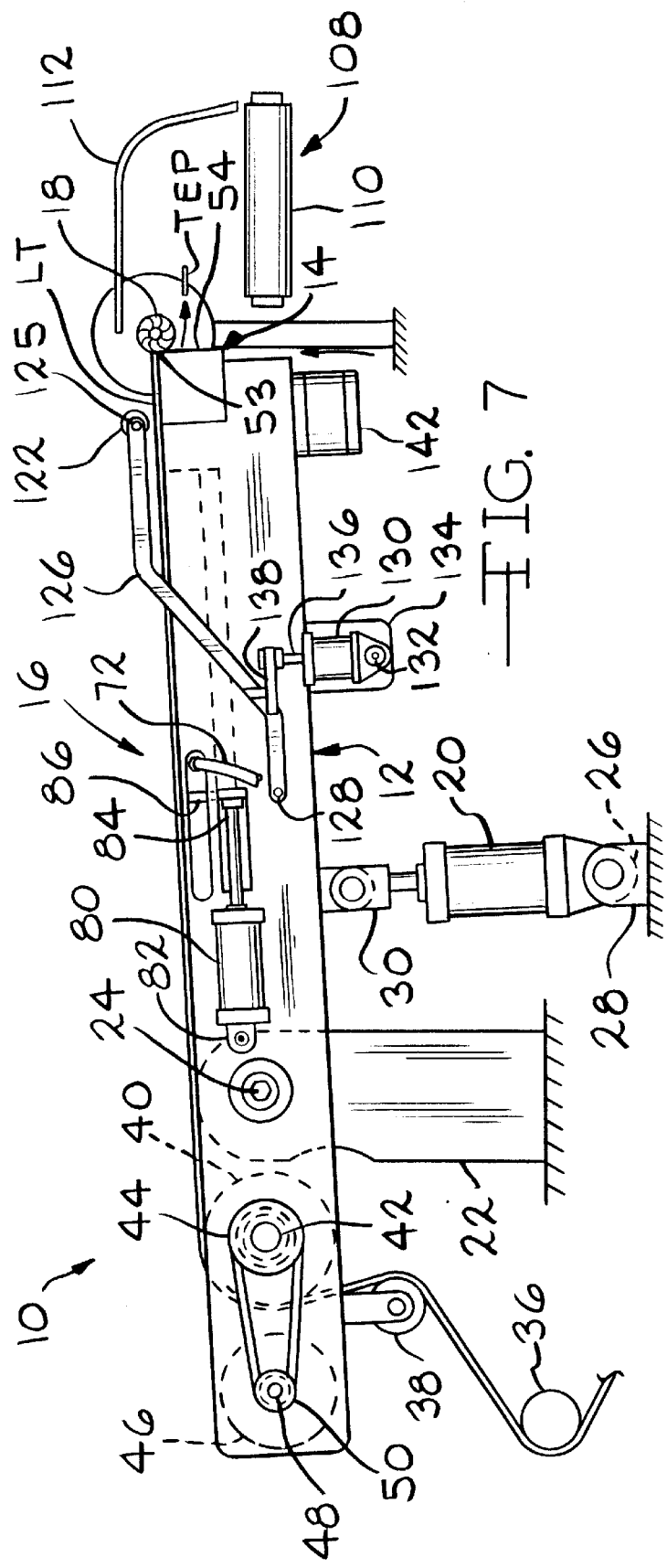
FIG. 7

APPARATUS AND METHOD FOR PROVIDING A RELEASE TAB ON LINED TAPE

BACKGROUND OF THE INVENTION

1. Field of the Invention

The present invention relates to lined tape which is used extensively in the automotive field and elsewhere to hold parts together. More specifically, the invention is directed to apparatus for removing an end portion of the tape from an end portion of the liner, leaving the end portion of the liner intact to serve as a release tab for removing the liner.

2. Description of the Prior Art

Two sided tape is used in many applications for securing parts together. For example, lengths of lined, two sided tape are adhered to automotive trim pieces with the liner facing away from the part, usually at a supplier's facility, and the parts are shipped to a manufacturer. During manufacturing, the liner is removed, exposing the tape adhesive and the part is pressed into place on a vehicle. Liner removal is certainly a problem, as anyone who has ever tried to remove a stubborn liner from an adhesive surface knows. A prior art approach to this problem, which is in use at least in the automotive industry, involves securing a separate release tab to a portion of the liner. The tab is then pulled, causing the liner to separate from the tape.

During a search directed to the subject matter of this invention, the following U.S. Patents were noted: U.S. Pat. Nos. 4,220,490 (Carlson), 4,317,852 (Ogden), 4,341,828 (Stephens), 4,475,969 (Reed), 4,849,043 (Instance), 5,167,752 (Dowling) and 5,492,590 (Sakai).

Carlson discloses a method for making a laminate with a removable scored paper backing. The method involves the use of a release agent which is applied to the paper while the moisture content of the paper is controlled.

Ogden discloses a label assembly including an adhesive masking portion at each end of the label.

Stephens discloses masking tape adapted for use in refinish spray painting. The tape includes a removable cover for protecting the adhesive during storage.

Reed discloses a method for applying labels to cylindrical surfaces. According to the method, labels are removed from paper label stock and redeposited on a liner and applied to a cylindrical surface.

Instance discloses a method for producing labels and, more specifically, a method for repositioning labels on a liner after they have been die cut and the trim removed. Specifically, the labels are removed from the liner and repositioned on that liner so that the labels cover any nicks or cuts in the liner arising from the die cutting.

Sakai discloses a method for peeling an interlayer or liner from one side of a two sided adhesive tape. The method is particularly suited for use in a method for adhering an integrated driver circuit to an anisotropic conductive film which usually takes the form of a two sided adhesive tape. The sticky side of a peeling tape is pressed onto the interlayer or liner so that it adheres thereto and the two tapes are peeled off, thereby removing the interlayer or liner from the two sided tape. This appears to be similar to the prior art use of separate release tabs, discussed above in reference to the automotive industry.

There remains a need for apparatus for effectively providing a release tab which can be used to easily peel a liner from one side of a two sided tape.

SUMMARY OF THE INVENTION

The present invention is concerned with apparatus for removing a portion of two sided tape from a laminate comprising co-extensive pieces of that tape and a liner covering one side of the tape. The apparatus comprises a carriage with an anvil, a tape advancer for advancing lined tape along the carriage to position and end portion of the tape adjacent to a working surface of the anvil, a rotatable cutter positioned adjacent to the anvil and an actuator for causing relative movement between the anvil and the cutter. Such movement between the cutter and the anvil causes an end portion of the tape to lay down on the anvil and further movement shears an end portion of the tape from the lined tape, leaving the adjacent end portion of the liner intact. The apparatus may further comprise a tape cutter and actuators for applying the tabbed tape to a part and for cutting the tabbed tape to a predetermined length. According to the method of the present invention, lined tape is supplied to a carriage including an anvil and a tape advancer. The tape is advanced by the advancer so that an end portion extends over a working surface of the anvil. A rotatable cutter is positioned adjacent to the anvil and relative movement between the cutter and the anvil is effected so that the tape lays down on the anvil, liner side down. Further movement is effected so that the cutter moves along the surface of the anvil, spaced therefrom a distance substantially corresponding with the thickness of the liner. The cutter shears an end portion of the tape from the lined tape, leaving a release tab consisting of the liner. The method may include the step of applying an end of the tape to a tape receiving portion of a part which is advancing, causing tape to be payed out as it is pressed into the tape receiving portion of the moving part. An encoder keeps track of the length of tape which is payed out and, when the desired length is payed out, a cutter mechanism cuts the tabbed tape to the desired length.

Accordingly, it is an object of the present invention to provide an apparatus for shearing an end portion of a tape from a laminate comprising the tape and a liner, leaving an end portion of the liner intact to serve as a liner release tab.

It is a further object of the invention to provide such an apparatus including a cutter for cutting the tabbed tape to a desired length.

It is yet another object of the invention to provide such an apparatus including a tape applicator for applying the tabbed tape to a part.

These and other objects will be apparent to those skilled in this art from the following detailed description and drawing figures.

BRIEF DESCRIPTION OF THE DRAWINGS

FIG. 1 is a side view of apparatus according to the invention for removing an end portion of tape from a laminate comprising the tape and a liner, leaving an end portion of the liner intact to serve as a liner release tab and for applying the tape to a part.

FIG. 2 is side, detailed view, with portions broken away, of the tape advancing mechanism of the apparatus shown in FIG. 1.

FIG. 3 is an end view of the apparatus, taken along the line 3—3 of FIG. 2.

FIG. 4 is a sectional view of the apparatus, taken along the line 4—4 of FIG. 2.

FIG. 7 is a side view corresponding with FIGS. 2 and 6, as an end portion of a tape is being sheared by a cutter from a laminate comprising the tape and a liner, leaving an end portion of the liner intact to serve as a liner release tab.

DETAILED DESCRIPTION OF THE PREFERRED EMBODIMENT

Figure 5:
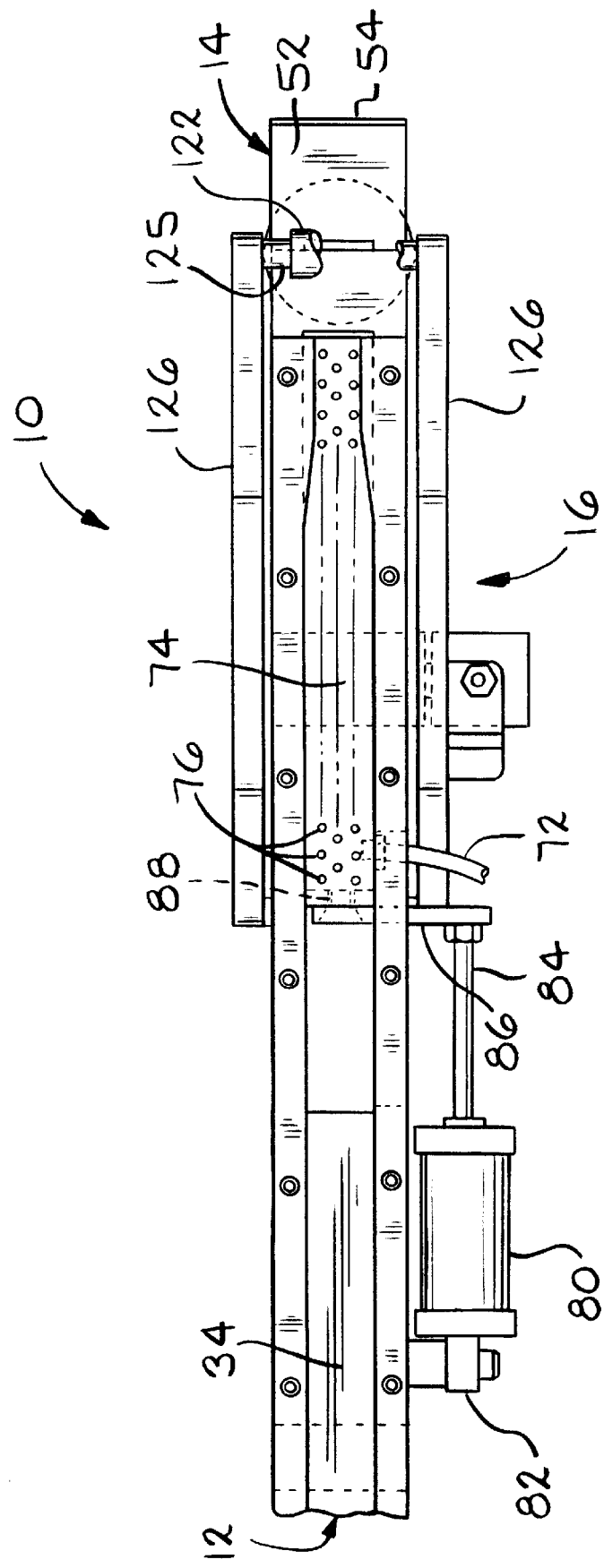
FIG. 5 is a top view of the portion of the apparatus that is shown in FIG. 2, taken along the line 5—5 of FIG. 2.

Referring now to FIG. 1, apparatus according to the present invention is indicated generally at 10. The apparatus is designed to operate on a lined tape LT (shown in some detail in FIG. 8) having a lined tape end portion LTEP. The lined tape LT may comprise a polymeric liner L and a two sided foam tape T. Typically, such a liner would have thickness of about five thousandths of an inch while such tape would have a thickness of anywhere from about ten thousandths of an inch to about seventy thousandths of an inch. In a first operation, a tape end portion TEP is removed from the lined tape LT, leaving intact a corresponding liner end portion LEP. In the second operation, a length of the remaining lined tape LT is applied to a part and the lined tape is cut to the required length. The liner end portion LEP serves as a liner release tab which can be easily grasped, making the subsequent removal of the liner L from the tape extremely easy.

Referring again to FIG. 1, the apparatus 10 comprises a carriage 12 including an anvil 14, a tape advancer, indicated generally at 16, a rotatable cutter 18 and an actuator 20 for effecting relative movement between the anvil 14 and the cutter 18.

Figure 9:
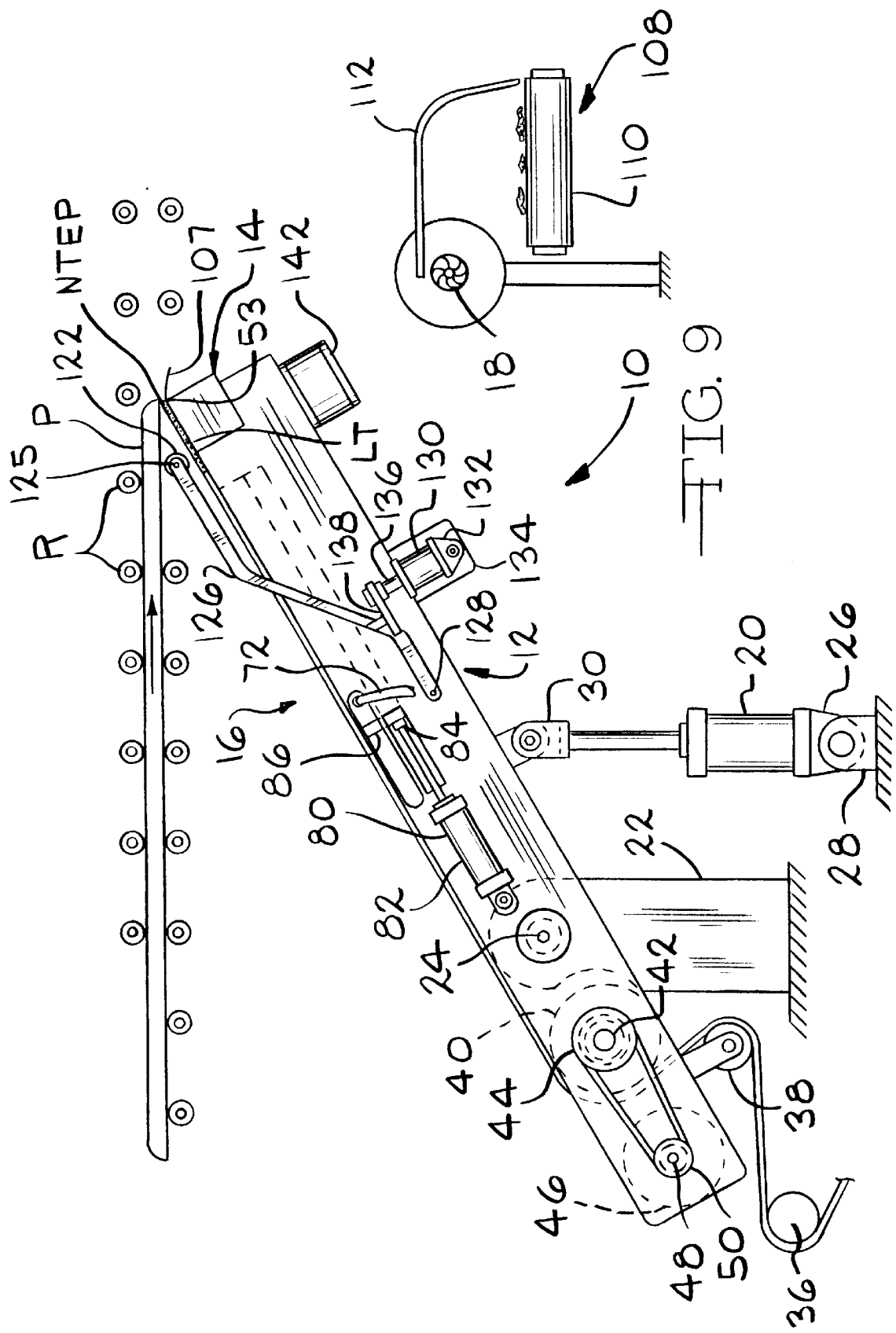
FIG. 9 is a side view corresponding with FIG. 2, as the tape with integral liner release tab is applied to a part.

In the embodiment shown in FIG. 1, the carriage 12 is pivotally mounted on a fixed base 22 for pivotal movement about an axis 24 from the position shown in FIG. 1 to the position shown in FIG. 7, to the position shown in FIG. 9, and back to the position shown in FIG. 1. Such movement is effected by the linear actuator 20 which has a lower end 26 which is secured to a fixed base 28, and an upper end 30 which is secured to a bracket 32 which, in turn, is secured to the carriage 12. Preferably, the actuator 20 is a pneumatic actuator although other actuator types may be used.

The carriage has a generally planar upper surface 34 and lined tape LT is fed, as indicated by arrows, from a supply spool (not shown), over rollers 36, 38 and 40 and onto the upper surface 34. Roller 40 is mounted on a shaft 42 as is a pulley 44. An encoder 46 has a shaft 48 with a pulley 50 mounted thereon. A belt 52 is journaled on the pulley 44 and the pulley 50 so that rotation of the roller 40 is translated into rotation of the shaft 48 of the encoder 46. The encoder 46 can be pre-set to generate a signal when a predetermined length of lined tape LT has passed over the roller 40.

The anvil 14 has an upper surface 52 which is generally co-planar with the upper surface 34 of the carriage 12. The anvil 14 also has an edge 53 and a working surface 54 which is nearly at right angles to the upper surface 52. The edge 53 is between the upper surface and the working surface. Further details about the anvil 14 are described below with reference to FIG. 8.

Referring now to FIGS. 1 through 6, the tape advancer 16 comprises a cross linear slide 60 which is secured to the carriage 12 in a recess, the bottom of which is indicated at 62. The linear slide 60 comprises a base 64, a slide plate 66 and a plurality of bearings 68 which provide for linear movement between the base 64 and the slide plate 66. The base 64 is secured to the bottom 62 of the carriage recess and a vacuum chamber 70 is secured to the slide plate 66. One end of a vacuum hose 72 is connected to the vacuum chamber 70 and is in communication with the interior thereof. The other end of the conduit is connected to a vacuum source (not shown). The top of the vacuum chamber 70 is covered with a vacuum chamber cover plate 74 which has a large number of vacuum holes extending therethrough, which are indicated generally at 76 in FIGS. 4 and 5. When a vacuum is applied to the interior of the vacuum chamber 70, air is drawn in through the vacuum holes 76 so that a lined tape LT, positioned on the vacuum chamber cover plate 74 over the vacuum holes 76, is pulled into contact and into frictional engagement with the vacuum chamber cover plate 74.

Figure 6:
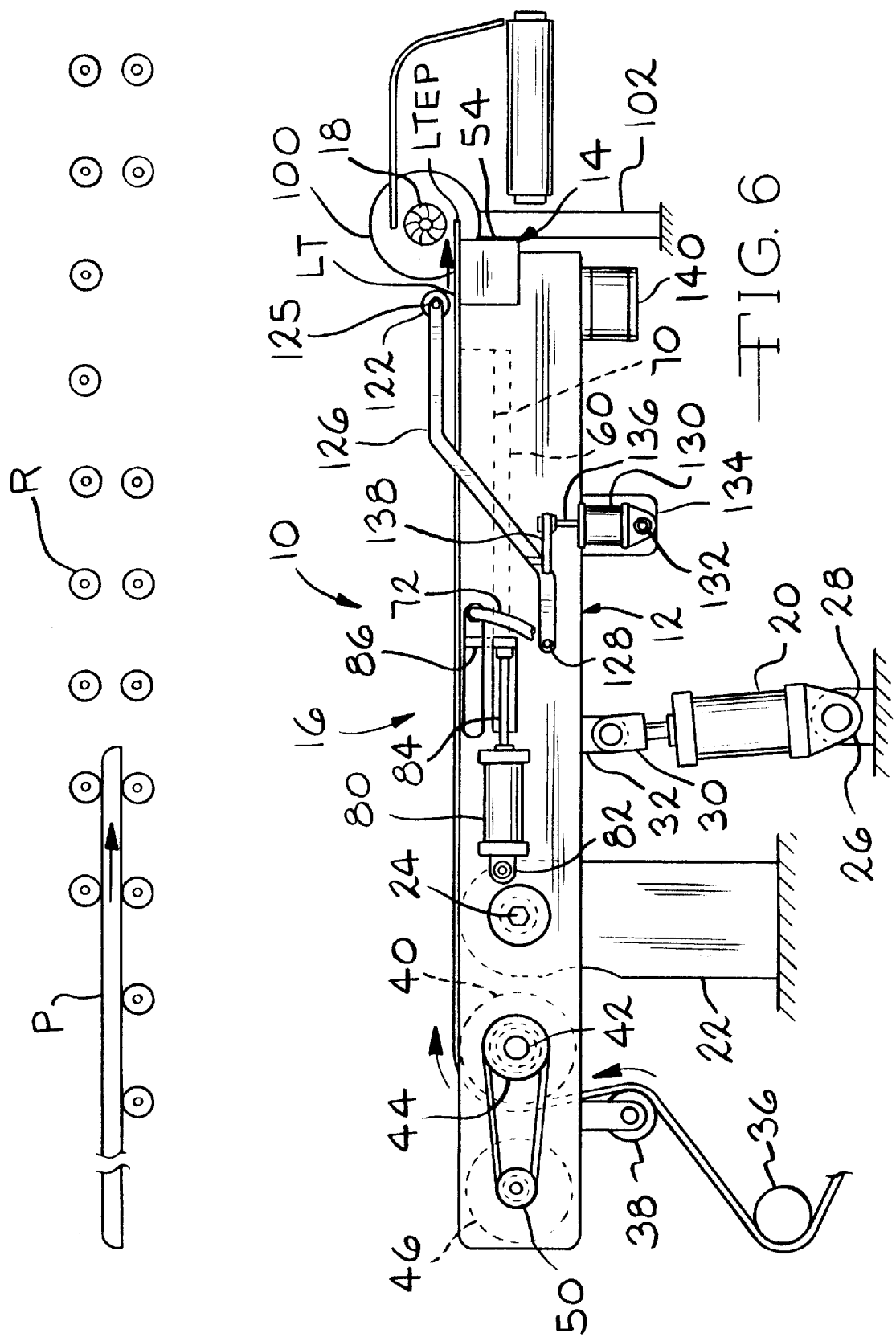
FIG. 6 is a side view of the apparatus shown in FIG. 1, after a tape advancer has advanced a tape so that a portion overhangs an anvil.

The cover plate 74, together with the vacuum chamber 70 and the slide plate 66, reciprocate in the carriage recess between a first, retracted position, as shown in FIG. 1 and a second, advanced position as shown in FIG. 2, 5 and 6. This reciprocation is effected by an actuator 80 having a first end 82 which is secured to the carriage 12 and a second end 84 which is secured to a bracket 86. In turn, the bracket is secured to the vacuum chamber 70 by a fastener 88 (shown in phantom lines in FIG. 5). The actuator is preferably a pneumatic actuator.

The operation of the tape advancer 16 begins with the actuator 80 retracted so that the cover plate 74, the vacuum chamber 70 and the slide plate 66 in the first, retracted position (FIG. 1). Lined tape LT is positioned on the vacuum chamber cover plate 74 with the liner side in contact with the cover plate 74. A vacuum is applied to the vacuum chamber 70 causing the liner L of the lined tape to be pulled into tight contact and frictional engagement with the cover plate 74. The actuator 80 is activated, causing the cover plate 74, the vacuum chamber 70 and the slide plate 66 to more to the second, advanced position (FIGS. 2, 5 and 6). Due to the frictional engagement between the liner L and the cover plate 74, the lined tape LT is also advanced, relative to the carriage 12, from left to right in FIGS. 1, 2, 5 and 6. The tape advancer 16 is configured, relative to the carriage 12, so that, at the end of this cycle, the lined tape end portion LTEP extends beyond the upper anvil surface 52, overhanging the anvil working surface 52 and the edge 53, as shown in FIG. 6. The length of the lined tape end portion LTEP which extends beyond the upper anvil surface 52 will correspond with the length of the liner end portion LEP which constitutes the release tab which will remain on the lined tape LT after a tape end portion TEP is removed therefrom. Although this length is not critical, it should be long enough so that the release tab can be easily grasped and not so long as to be wasteful. It will be appreciated that the vacuum should be discontinued when the vacuum chamber is moved, by the actuator 80, from the advanced position to the retracted position, so that there is no frictional engagement during this movement.

Figure 8:
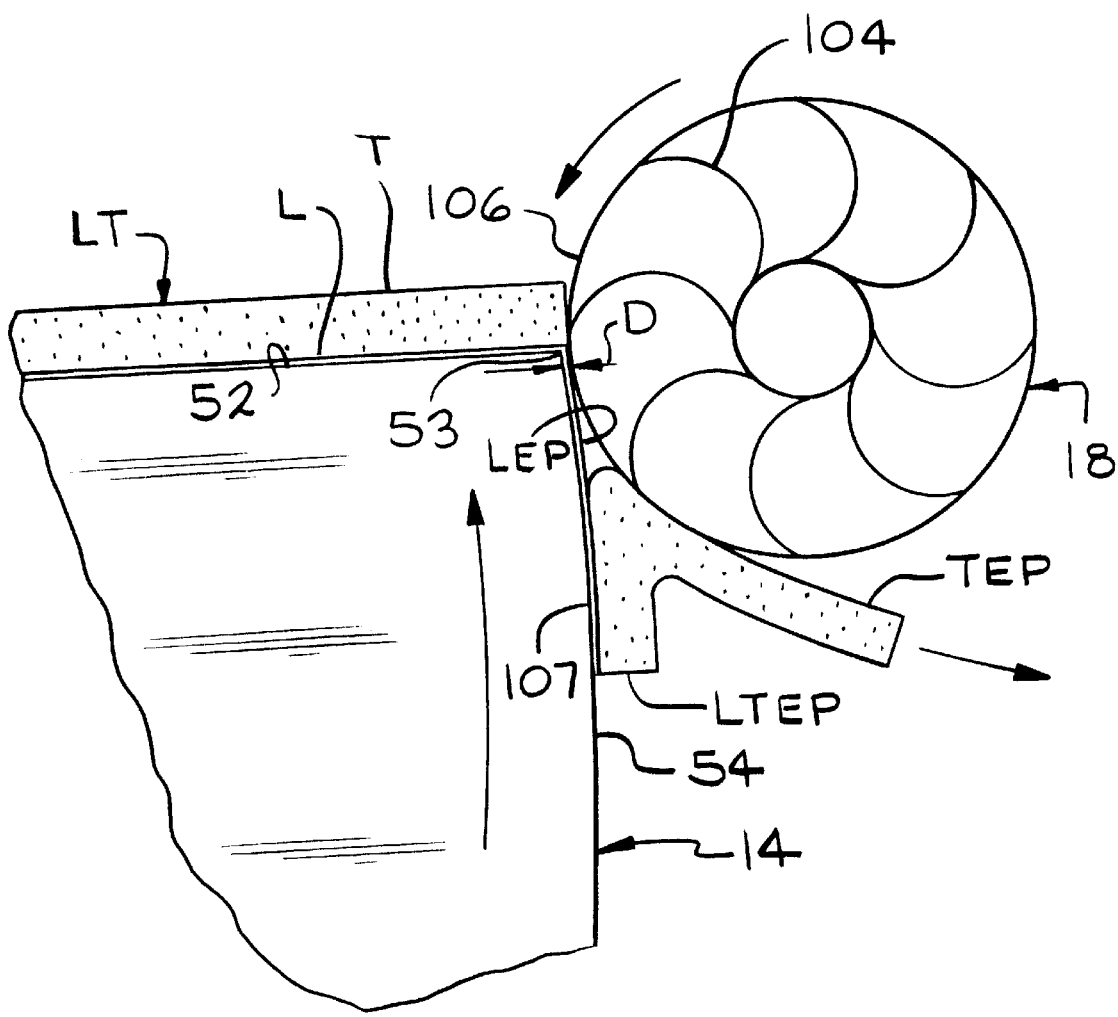
FIG. 8 is a detailed view of the cutter and anvil shown in FIG. 7.

Referring now to FIGS. 7 and 8, the formation of a liner release tab will now be described. The rotatable cutter 18 is mounted on a motor 100 which, in turn, is mounted on and supported by a fixed base 102. It is preferred that the motor 100 be an air motor in order to achieve the high rotational speeds which have been found to work best. Generally speaking, twenty to forty thousand revolutions per minute will produce good results. A release tab is formed by causing relative movement between the anvil 14 and the cutter 18 when an end portion of the lined tape LTEP is overhanging the upper surface 52 of the anvil 18, as shown in FIG. 6. In the apparatus shown, such movement is effected by the actuator 20 which is operable to move the carriage 12 from the position shown in FIG. 6, where the cutter 18 is above the working surface 54 of the anvil, to the position shown in FIGS. 7 and 8 where the cutter 18 is immediately adjacent to the working surface 54.

A variety of cutting tools are suitable for use in the apparatus 10 although excellent results of been achieved with a one half inch rotary cutter having eight flutes 104. When rotating, the cutter 18 has, in effect, a cylindrical working surface 106 and anything which penetrates that surface will be cut by the next flute 104. In the apparatus 10, the working surface 106 of the cutter 18 is caused to pass along the working surface of the anvil, separated therefrom by a distance D which is equal to or slightly greater than the thickness the liner L For example, with a liner L having a thickness of five thousandths of an inch, the distance D would be about five thousandths of an inch up to about eight thousandths of an inch. As the cutter 18 approaches the upper anvil surface 52, the end portion of the lined tape is caught between the cutter 18 and the edge 53. Continued relative motion between the cutter and the working surface of the anvil causes the cutter 18 to shear off an end portion of the tape TEP from the lined tape LT and, as the cutter 18 continues to move along the working surface 54 of the anvil 14, the end portion of the tape TEP is completely removed from the corresponding end portion of the liner LEP, as shown in FIG. 7. The end portion of the liner LEP, however, remains connected to the rest of the liner L. In other words, the liner L remains completely intact. The liner end portion LEP now constitutes a liner release tab 107. In order that the working surface 106 of the cutter 18 and the anvil working surface 54 remain separated by the distance D, the anvil working surface 54 has a slight curvature. This is necessary because the carriage 12 pivots and the curvature of the anvil working surface would correspond with a portion of a cylinder having a radius equal to the distance between the axis 24 and the anvil working surface 54.

It will be appreciated that the carriage 12 need not pivot in order to cause the required relative movement between the anvil working surface 54 and the cutter 18. For example, the anvil 14 could remain stationary while the cutter 18 is advanced across the working surface 54 to cause relative motion corresponding in result with that described above in the case where the carriage is moved. Alternatively, the carriage 12 could be advanced linearly by one or more actuators (not shown) while the cutter 18 remains stationary, but rotating. In these cases, the anvil working surface 54 would preferably be planar.

Adjacent to the anvil 14 and the cutter 18, there is a tape end remover 108 (FIGS. 1, 7 and 9) comprising a conveyor 110 which conveys tape end portions TEP laterally, relative to the carriage and out of the way. A shield 112 prevents tape end portions TEP from flying upwardly and outwardly while serving as a safety shield for the cutter 18.

Figure 10:
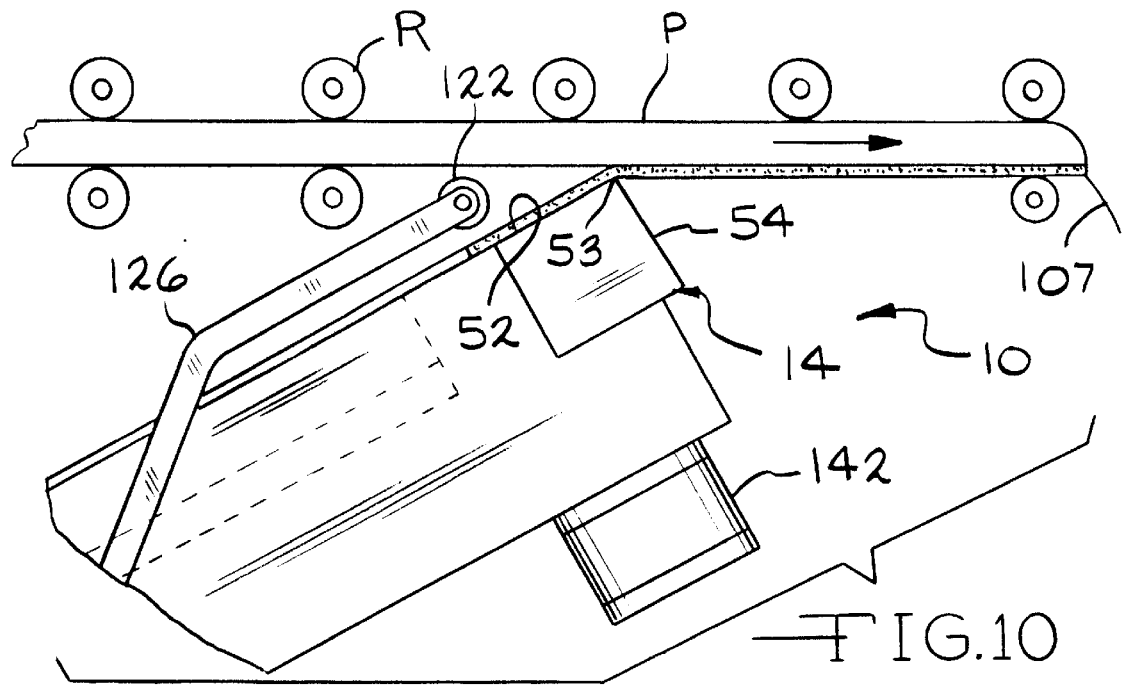
FIG. 10 is a detailed view of the apparatus during the application of tape with a liner and an integral liner release tab, to a part.
Figure 11:
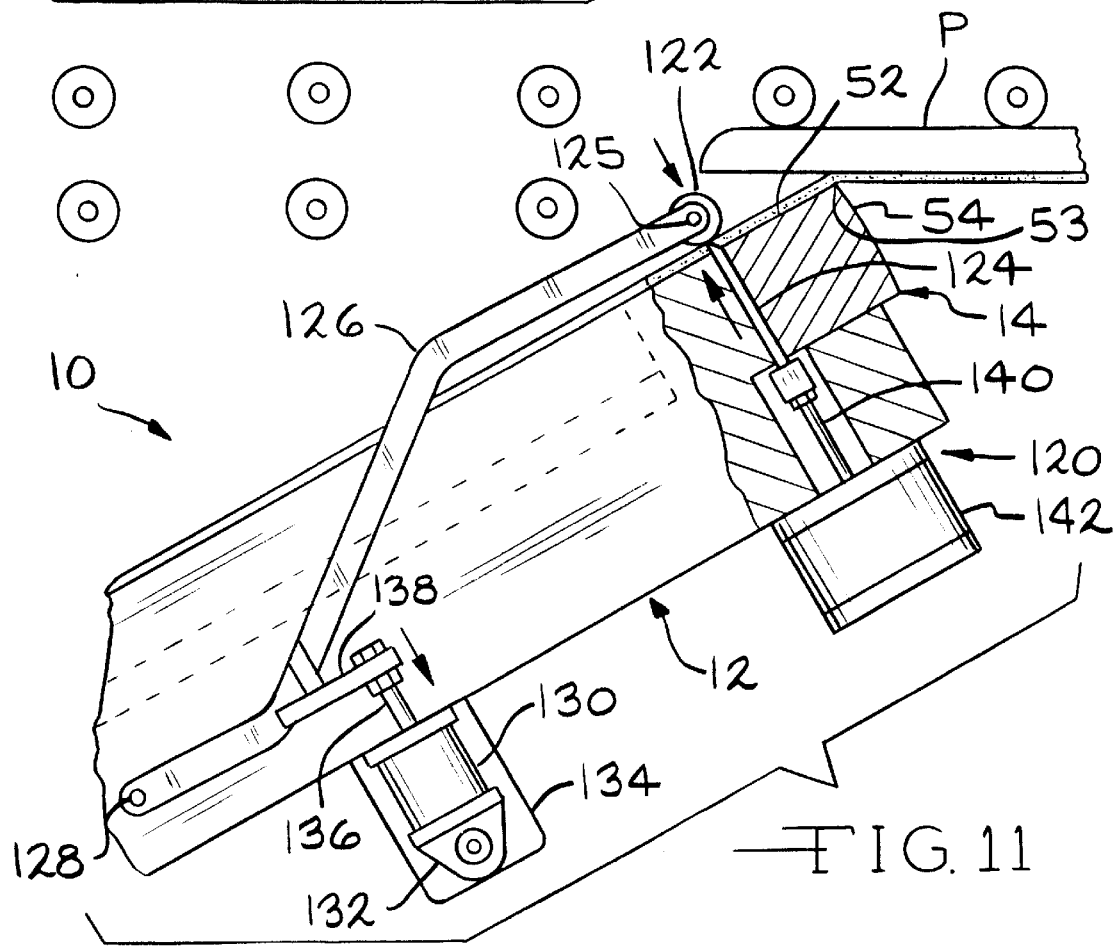
FIG. 11 is a view showing the details of a tape cutter mechanism of the apparatus.

Referring now to FIGS. 9 through 11, the apparatus 10 is adapted to apply a length of lined tape LT, including the liner release tab 107, to a part P advancing, in the direction of the arrow, along a conveyor comprising rollers R. The actuator 20 causes the carriage 12 to pivot from the position shown in FIG. 7 to the position shown in FIG. 9 where a new end portion of the tape NTEP contacts a part P at a desired location. An adhesive surface of the tape adheres the lined tape LT to the part P as the upper surface 52 of the anvil 14 presses the lined tape LT onto the part P, as shown in FIG. 10. At this time, there would be no vacuum applied to the vacuum chamber as that would interfere with the movement of the lined tape across the vacuum chamber cover plate. As the part P advances, it pulls lined tape LT into and through the apparatus 10 from a supply spool (not shown). The lined tape LT passes over pulleys 36, 38 and 40. The rotation of the roller 40 is translated into rotation of the encoder 46 which, as noted above, can be pre-set to generate a signal when a pre-determined length of lined tape LT has passed over the roller 40. This signal can be transmitted to a tape cutter indicated generally at 120 in FIG. 11.

The tape cutter 120 comprises a roller 122 and a cutter 124. The roller is mounted on a rod 125 which is supported between a pair of swing arms 126 (both are shown in FIG. 5) which are connected to the carriage 12 for pivotal movement about an axis 128. An actuator 130 has a first end 132 which is connected to a bracket 134 which, in turn, is connected to the carriage 12. A second end 136 of the actuator 130 is connected to a bracket 138 which, in turn, is connected to one of the swing arms 126. The actuator 130 is operable to pivot the swing arms 126 from a first, retracted position shown in FIG. 10 to a second, engaged position shown in FIG. 11. With the swing arms 126 in the second position, the roller 122 is positioned, as shown in FIG. 11, on the lined tape LT, opposite the cutter 124.

The cutter 124 is supported on a first end 140 of an actuator 142 which is secured to and supported on the carriage 12. The actuator 142 is operable to move the cutter 124 between a first, retracted position, as shown in phantom lines in FIG. 2, and a second, cutting position shown in FIG. 11. When the swing arms 126 are in the second position, the actuator 142 advances the cutter 124 to the second position until the cutter 124 cuts through the lined tape LT comprising the tape T and the liner L. The roller 122 provides the necessary back pressure required for a clean cut and maintains the lined tape LT in proper position, flat against the upper surface 34 of the carriage 12 and against the cover plate 74 of the vacuum chamber 70. After the lined tape LT is cut by the cutter 124, as the part P continues to advance to the right from the position shown in FIG. 11, the remainder of the cut piece of lined tape LT is applied to the part P, being pressed thereagainst by the upper surface 52 of the anvil 14. Once the piece of lined tape LT has been applied to the part P, the carriage 12 is returned to the position shown in FIG. 1 through the operation of the actuator 20. Preferably, the cutter 120 is actuated in response to a signal, from the encoder 46, indicating that a pre-determined length of tape has passed through the apparatus 10.

A method according to the present invention, for producing a integral liner release tab on the end of lined tape comprising tape and a liner, will now be described. The lined tape is advanced along a carriage towards an anvil until an end portion extends beyond a working surface of the anvil, and the end portion is positioned between the anvil and a rotating cutter. Relative movement is effected between the anvil and the rotating cutter so that the cutter traverses at least a portion of the working surface while a working surface of the cutter is spaced from the working surface a distance corresponding with the thickness of the liner, so that an end portion of the tape is removed from the lined tape, leaving a corresponding end portion of the liner intact to constitute an integral liner release tab. With the portion of the two side tape removed, there remains a two sided tape with a liner covering the remaining portion of the tape and an integral liner release tab. The method may further comprise the steps of pressing the new end portion of the tape onto an advancing part, tracking the length of tape that is applied to the part and cutting the lined tape to a predetermined length. The method may be carried out continuously by repeating the foregoing steps.

It will be appreciated that the apparatus 10 may be operated continuously and that various controllers may be incorporated to sequence and control the various operations of the apparatus. Such controllers are well known to those skilled in the art and their application to the subject apparatus would be well within the ability of such skilled persons. Accordingly, such controllers are not further described but are not to be considered as being outside the scope of the invention.

The foregoing description is intended to enable one skilled in the art to make and use the instant invention. It will be appreciated that various modifications and enhancements may occur to those skilled in the art and that these may be resorted to without departing from spirit and scope of the invention as it is defined in the following claims.

What is claimed is:

1. A method for producing an integral liner release tab on an end of a length of lined tape, said method comprising the steps of advancing an end of the lined tape onto a substantially planar first working surface of an anvil until the end and an adjacent portion of the lined tape extend beyond a linear edge of the first working surface, causing relative movement between a cylindrical cutting surface of a cutter which rotates about a rotational axis and a second substantially planar working surface of the anvil which second working surface intersects the first working surface at the linear edge, the relative movement between the cylindrical cutting surface and the second working surface of the anvil being comparable to that which occurs when the cylindrical cutting surface moves past the linear edge and across the second surface in cutting relationship therewith and the cylindrical cutting surface is spaced from the second surface, when in cutting relationship therewith, by approximately the thickness of the liner of the lined tape, whereby the overhanging end portion of the lined tape is caught between the second working surface of the anvil and the cylindrical cutting surface, causing the overhanging end portion of the lined tape to lie against the second working surface of the anvil and, further, so that the cylindrical cutting surface removes a portion of the tape from the overhanging end portion of the lined tape, thereby creating a new tape end portion while leaving the liner from the overhanging end portion of the lined tape intact.

2. The method claimed in claim 1 which further comprises the step of cutting through the lined tape to produce a piece of lined tape including the integral liner release tab.

3. The method claimed in claim 1 which further comprises the step of applying the new tape end portion and a predetermined length of the lined tape to a part which is advancing.

4. The method claimed in claim 3 which further comprises the step of cutting through the lined tape and completing the step of applying the length of lined tape to the part.

5. The method claimed in claim 1 wherein the step of advancing the lined tape is effected by a applying vacuum to engage the lined side of the length of lined tape frictionally at a first, retracted position, and moving the position at which the vacuum is applied and the lined tape to a second, advanced position.

* * * * *